US012612485B2

(12) United States Patent     (10) Patent No.:   US 12,612,485 B2

Bodmann et al.     (45) Date of Patent:    Apr. 28, 2026

(54) CONTINUOUS PRODUCTION OF POLYURETHANE PREPOLYMERS

(71) Applicant: BASF SE, Ludwigshafen am Rhein (DE)

(72) Inventors: Daniela Bodmann, Lemfoerde (DE); Carsten Hinke, Lemfoerde (DE); Nadine Schliebe, Lemfoerde (DE); Jan-Michael Dreisoerner, Lemfoerde (DE); Henning Wettach, Bonn (DE); Hendrik Wagner, Lemfoerde (DE); Julio Albuerne, Lemfoerde (DE); Florian Puch, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 586 days.

(21) Appl. No.: 17/599,243

(22) PCT Filed: Mar. 29, 2020

(86) PCT No.: PCT/EP2020/058883

§ 371 (c)(1),
(2) Date: Sep. 28, 2021

(87) PCT Pub. No.: WO2020/201171

PCT Pub. Date: Oct. 8, 2020

(65) Prior Publication Data

US 2022/0185938 A1     Jun. 16, 2022

(30) Foreign Application Priority Data

Apr. 1, 2019   (EP) ..................................... 19166552

(51) Int. Cl.
*C08G 18/10*     (2006.01)
*B01J 19/00*     (2006.01)
(Continued)

(52) U.S. Cl.
CPC ...... *C08G 18/0895* (2013.01); *B01J 19/0013* (2013.01); *B01J 19/0033* (2013.01);
(Continued)

(58) Field of Classification Search
CPC ...................................................... C08G 18/10
See application file for complete search history.

(56) References Cited

U.S. PATENT DOCUMENTS 4,742,095 A * 5/1988 Markusch .......... C08G 18/7818
                                    523/322
5,471,037 A * 11/1995 Goethel ............... B01J 19/2415
                                   204/157.43
(Continued)

FOREIGN PATENT DOCUMENTS

WO       0114441 A1    3/2001
WO       0191897 A1   12/2001
(Continued)

OTHER PUBLICATIONS

International Search Report for corresponding PCT/EP2020/058883 mailed Jun. 25, 2020, 2 Pages.
(Continued)

*Primary Examiner* — Michael L Leonard
(74) *Attorney, Agent, or Firm* — Armstrong Teasdale LLP

(57) ABSTRACT

Described herein is a continuous process for producing polyurethane prepolymers in a residence time reactor with plug flow. Also described herein is a method of using these prepolymers for producing polyurethanes.

8 Claims, 3 Drawing Sheets

(51) Int. Cl.
   *C08G 8/12*          (2006.01)
   *C08G 18/08*         (2006.01)
(52) U.S. Cl.
   CPC ............ *B01J 19/0066* (2013.01); *C08G 8/12*
        (2013.01); *C08G 18/10* (2013.01); *B01J*
        *2219/00033* (2013.01); *B01J 2219/00051*
        (2013.01); *B01J 2219/00166* (2013.01)

(56)                References Cited

U.S. PATENT DOCUMENTS

| | | | |
|---|---|---|---|
| 8,101,704 | B2 | 1/2012 | Baumann et al. |
| 8,784,712 | B2 | 7/2014 | Andrews et al. |
| 8,835,591 | B2 | 9/2014 | Pirkl et al. |
| 9,790,194 | B2 | 10/2017 | Richter et al. |
| 2007/0260357 | A1 | 11/2007 | Issberner et al. |
| 2012/0004374 | A1 | 1/2012 | Stanjek et al. |

FOREIGN PATENT DOCUMENTS

| | | | |
|---|---|---|---|
| WO | 2006094706 | A1 | 9/2006 |
| WO | 2007040996 | A2 | 4/2007 |
| WO | 2016054138 | A1 | 4/2016 |

OTHER PUBLICATIONS

Jiri Vojtesek et al, "Control Of Temperature Inside Plug-Flow Tubular Chemical Reactor Using 1DOF And 2DOF Adaptive Controllers", ECMS 2018 Proceedings Edited by Lars Nolle, Alexandra Burger, Christoph Tholen, Jens Werner, Jens Wellhausen,May 25, 2018 (May 25, 2018), pp. 239-245.

\* cited by examiner

CONTINUOUS PRODUCTION OF POLYURETHANE PREPOLYMERS

CROSS-REFERENCE TO RELATED APPLICATIONS

This application is a U.S. National Phase Application of International Patent Application No. PCT/EP2020/058883 filed Mar. 29, 2020, which claims priority to European Patent Application No. 19166552.0, filed Apr. 1, 2019, the entire contents of which are hereby incorporated by reference herein.

FIELD OF INVENTION

The present invention relates to a continuous process for producing polyurethane prepolymers in a residence time reactor with plug flow and to the use of these prepolymers for producing polyurethanes.

BACKGROUND

Production of storage-stable polyurethane prepolymers can be carried out by batch processes and continuous processes.

WO 1994/29361 A1 describes the classical production of isocyanate-terminated prepolymers at temperatures of 40-100° C. in a reaction vessel.

DE 198 23 392 A1 describes the production of isocyanate-terminated polyurethane prepolymers using a dynamic mixing head of a foam system. Foaming to afford the polyurethane molding is performed directly within the same process.

DE 10 2010 027 052 A1 relates to continuous production of isocyanate-terminated polyurethane prepolymers, the components being brought together in a mixing device and the actual reaction being completed in a storage or mixing tank.

WO 2001/091897 A1 discloses the continuous production of isocyanate-terminated polyurethane prepolymers using a plug flow reactor, wherein the reactor is a perforated plate reactor. The mixing of the components is carried out separately here.

WO 2001/014441 A1 discloses the temperature-controlled production of isocyanate-terminated polyurethane prepolymers having a low residual NCO content. The isocyanate-terminated polyurethane prepolymers are produced continuously in a static mixer, wherein the ratios of the respective proportions vary by up to +/−5%.

EP 0 722 962 A2 discloses a continuous process for production of isocyanate-terminated polyurethane prepolymers. The production relates to prepolymers having an NCO content between 5% and 15%. After production the prepolymer is transferred directly to the foaming process which affords a polyurethane molding.

It is an object of the invention to provide a continuous process for producing polyurethane prepolymers which allows production of different prepolymers with virtually complete conversion and high reproducibility and combines short reaction times with low energy consumption.

SUMMARY OF THE INVENTION

It has now been found that products of identical specification (for example NCO content and viscosity) are obtainable in a residence time reactor with plug flow as are obtainable in the corresponding stirred tank process, in particular in case of adiabatic temperature management. The obtained products have excellent storage stabilities and the corresponding polyurethane moldings provide identical properties as polyurethane prepolymers produced using a conventional stirred tank process. The process is moreover provided with self-learning process optimization which comprises performing dynamic formulation management, so that product quality is subjected to only very slight variations even when for example variations in raw material qualities or ambient conditions occur.

DETAILED DESCRIPTION OF THE INVENTION

Figure 1:
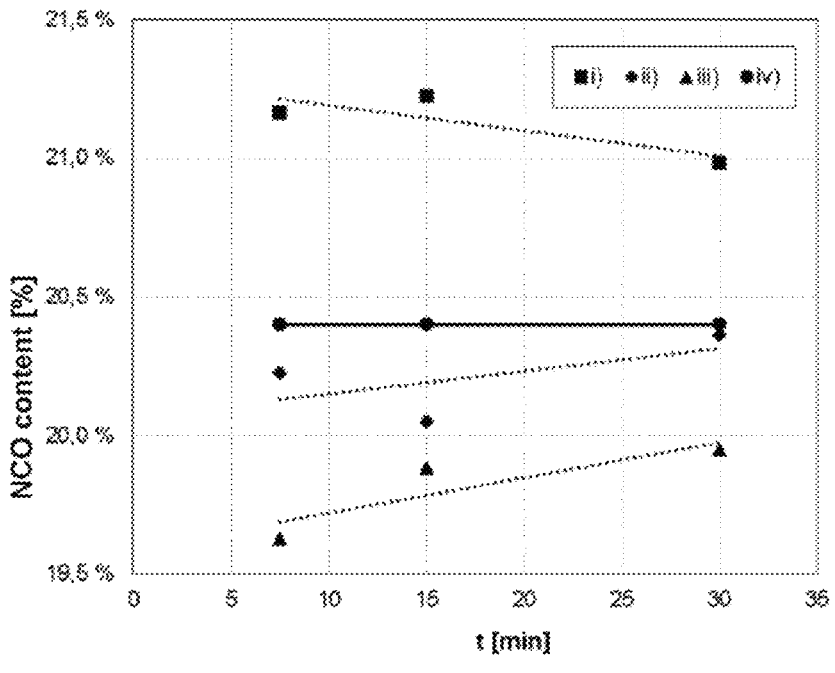
FIG. 1 shows the profile of the NCO content of the product of a feedback loop leaving the residence time reactor over a process running time of about 30 minutes for various starting temperatures at the entrance to the residence time reactor.

The invention provides a continuous process for producing polyurethane prepolymers. The process comprises the reaction of a) di- or polyisocyanates with b) compounds having isocyanate-reactive hydrogen atoms, optionally in the presence of c) catalysts, additives, auxiliary and/or added substances, in a residence time reactor with plug flow. In one embodiment of the process, the reaction is carried out in the residence time reactor under adiabatic reaction conditions.

In the process according to the invention the value of at least one physical property of the product leaving the residence time reactor is periodically or continuously checked and in the event of a deviation from a predetermined target value the temperature and/or the flow rate of the reactants entering the residence time reactor and/or the (total) flow rate through the residence time reactor and/or the temperature of the residence time reactor are adapted. If the reaction in the residence time reactor is carried out under adiabatic reaction conditions in the event of a deviation from the predetermined target value the temperature and/or the flow rate of the reactants entering the residence time reactor and/or the (total) flow rate through the residence time reactor are adapted.

In one embodiment of the process the value of at least one physical property of the product leaving the residence time reactor deviates from a predetermined target value by less than 10%, preferably less than 8%, particularly preferably less than 6%. This has the result that the reaction of the reactants in the residence time reactor is carried out virtually completely, i.e. the reaction is already very largely complete upon leaving the residence time reactor. The reaction is at least 90%, preferably at least 95%, in particular at least 98% complete.

The predetermined target value corresponds to the value of the corresponding physical property recited in the product specification of the prepolymer to be produced. Examples of physical properties of the product are NCO value (determined according to EN ISO 11909), viscosity (measured at 25° C. according to DIN EN ISO 3219 with plate/cone measurement geometry at a shear rate of 40 1/s), molecular weight (number-average according to DIN55672-2, calibration with PMMA), hydroxyl number (according to DIN 5342 [1971-12]), or color number (Hazen color number determined according to ISO 6271 or Gardner color number determined according to ISO 4630). The target value can generally only be determined with an accuracy of ±5% as a consequence of measurement.

In one embodiment the value of the at least one physical property of the product leaving the residence time reactor is tested periodically, for example every 10 seconds to every 10 minutes, or every 30 seconds to every 5 minutes. In another embodiment the value of the at least one physical property of the product leaving the residence time reactor is checked continuously.

In one embodiment the process comprises comprehensive, continuous process and product control and the recording of process data and ambient parameters. Examples of process parameters are the change in viscosity, reaction temperature or reaction conversion (for example as a function of the NCO content). Examples of environmental parameters are air pressure, atmospheric humidity or ambient pressure. Data processing and feedback loops allow continuous process improvement.

According to the invention the reaction takes place in a residence time reactor with plug flow ("plug-flow reactor"). According to the invention a residence time reactor with plug flow is understood to mean a reactor, preferably a tubular reactor, having a Bodenstein number of at least 60, preferably at least 80 and in particular at least 100. The Bodenstein number indicates the ratio of convective and diffusive transport in the reactor. It characterizes the backmixing within a system and thus enables conclusions to be drawn about whether and to what extent volume elements or substances mix within a reactor as a result of the prevailing flows. It is defined as the ratio of the convection stream to the dispersion stream. It is a constituent of the dispersion model and is therefore also referred to as the dimensionless dispersion coefficient.

The Bodenstein number Bo is calculated according to $$Bo=u*L/D_{ax},$$

Therein:
u: is the flow velocity;
L: is the length of the reactor;
$D_{ax}$: is the axial dispersion coefficient.
The Bodenstein number can be derived experimentally from the residence time distribution. Assuming an open system:

$$\sigma_\theta^2=\sigma^2/\tau^2=2/Bo+8/(Bo)^2$$

where
$\sigma_\theta^2$: dimensionless variance;
$\sigma^2$: variance around the average residence time;
$\tau$: hydrodynamic residence time ($\tau=V_R/\dot{V}$, where $V_R$. is the volume of the reactor and $\dot{V}$ is the volume flow of the reactor).
The Bodenstein number is the measure of the breadth of the residence time distribution according to the dispersion model. The measured residence time spectrum is used to generate the cumulative residence time curve which is in turn used to determine the Bodenstein number in the reactor.

In one embodiment the reaction is carried out under adiabatic reaction conditions in a residence time reactor with plug flow ("plug-flow reactor"). The plug-flow reactor is used to achieve a uniform residence time distribution. In order to ensure the most adiabatic operation possible, the plug-flow reactor must be well insulated. In one embodiment of the process the residence time reactor is a static mixer which is in one variant provided with a double jacket as insulation. In a further embodiment of the process the residence time reactor is a dynamic mixer which is in one variant provided with a double jacket as insulation.

In the present invention the term adiabatic reaction conditions is to be understood as meaning that the process heat required for converting the starting materials to the polyurethane prepolymer is provided exclusively by preheating the starting materials and the heat of reaction but not by isothermal process management. This does not rule out the possibility that a preheating of the residence time reactor is carried out during startup of the continuous process.

In another embodiment the reaction in the residence time reactor is not carried out under adiabatic reaction conditions. If the value of the at least one physical property of the product leaving the residence time reactor deviates from a predetermined target value it is possible to carry out not only an adapting of the temperature and/or the flow rate of the reactants flowing into the residence time reactor and/or the (total) flow rate through the residence time reactor but also an adapting of the temperature of the residence time reactor, i.e. the residence time reactor may be additionally heated or cooled.

In one embodiment of the process the plug-flow reactor is brought to the desired starting temperature of the reaction during startup so that not too much reaction energy is lost through the heating of the reactor. In the case of a double-jacket static mixer heating may be effected using oil, water or steam; or electrical trace heating is used. After startup, the process may be operated over a relatively long period without interruption, for example up to two weeks or even longer.

In one embodiment of the process the temperature of the reactants entering the residence time reactor is adjusted via a heat exchanger. In one embodiment the heat exchanger is a plate heat exchanger. In another embodiment the heat exchanger is a tube bundle heat exchanger.

In one embodiment of the process the starting materials entering the residence time reactor have a temperature in the range from 40° C. to 150° C., preferably in the range from 50° C. to 140° C., more preferably in the range from 60° C. to 130° C. and most preferably in the range from 80° C. to 120° C., for example from 80° C. to 100° C.

In one embodiment of the process the flow rate through the residence time reactor is adjusted by controlling the conveying amount of the reactants into the residence time reactor. In one embodiment the conveying of the reactants is carried out using at least one screw pump.

In one embodiment of the process the residence time in the residence time reactor is 5 to 15 minutes, for example 8 to 12 minutes. The residence time is the quotient of the volume of the residence time reactor and the flow rate of the product stream through the residence time reactor. In one embodiment of the process the reaction in the residence time reactor is complete within not more than 10 minutes.

According to the invention at least one physical property of the product leaving the residence time reactor is periodically or continuously checked. In one embodiment of the process the composition of the product leaving the residence time reactor is determined by NIR spectroscopy. The conversion may be monitored using an NIR probe for example. If the composition of the product leaving the residence time reactor deviates from the predetermined value a dynamic adjustment of the temperature-reaction time profile is carried out. Conversion variations may thus be continuously dynamically compensated through feedback to the dosing unit. Dynamic formulation management is thus effected and product quality is therefore subject to only very minor variations.

FIG. 1 shows for example the profile of the NCO content of the product of such a feedback loop leaving the residence time reactor over a process running time of about 30 minutes for various starting temperatures at the entrance to the residence time reactor. The NCO content was measured using an NIR probe. Plotted on the abscissa is the process running time in minutes and on the ordinate the NCO content in percent. Curve i) was obtained for a starting temperature of 60° C. and curve ii) for a starting temperature of 80° C.; curve iii) was obtained for a starting temperature of 100° C. Curve iv) shows the profile in a batch process for comparison. As is apparent from the diagram with increasing process running time the NCO content of the product approaches the target value represented by the curve of the batch process.

Figure 2:
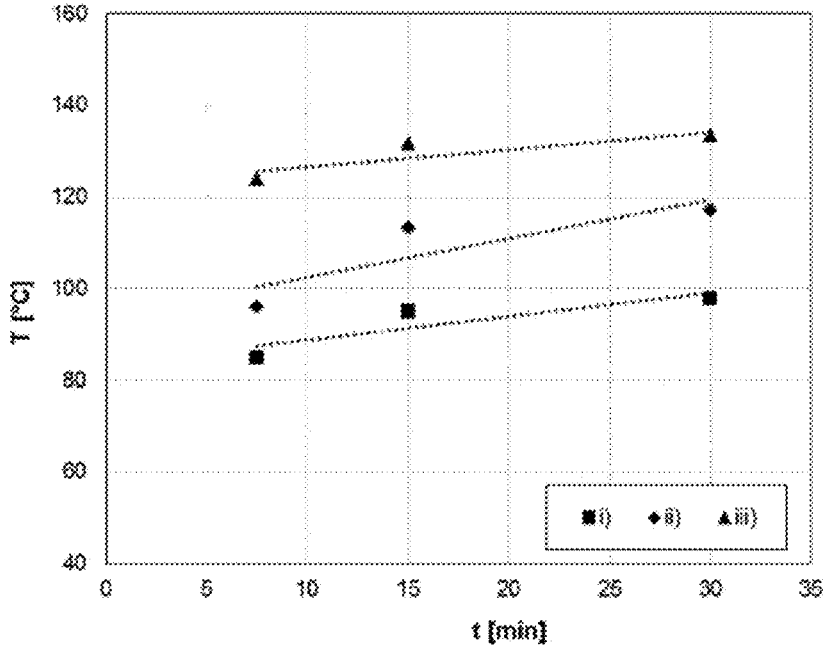
FIG. 2 shows the profile of the temperature of a feedback loop leaving the residence time reactor over a process running time of about 30 minutes for various starting temperatures at the entrance to the residence time reactor.

FIG. 2 shows for example the profile of the temperature of such a feedback loop leaving the residence time reactor over a process running time of about 30 minutes for various starting temperatures at the entrance to the residence time reactor. The residence time in the reactor was 10 minutes in each case. Plotted on the abscissa is the process running time in minutes and on the ordinate the temperature in degrees celsius. Curve i) was obtained for a starting temperature of 60° C. and curve ii) for a starting temperature of 80° C., curve iii) was obtained for a starting temperature of 100° C.

The process according to the invention is a learning continuous process for producing polyurethane prepolymers. After commencement of the process said process initially passes through an unstable phase A which transitions into a steady state B in which small adaptations of parameters remain possible. Carried out periodically or continuously during the process is a measurement/determination of process data C and a measurement/determination of product data D. In one embodiment the process data comprise temperatures, pressures and mass flows. In one embodiment the product data comprise the NCO content (e.g. determined via online NIR measurement), the viscosity and the color number of the product leaving the residence time reactor. The process data and product data and optionally external data are sent to a data processing, for example in a Production Information Management System (PIMS) or a cloud-based database and a data analysis G is carried out. In one embodiment the external data comprise the NCO content (e.g. determined by wet chemical analysis), the viscosity and the color number (e.g. Hazen color number according to ISO 6271 or Gardner color number according to ISO 4630) of the product leaving the residence time reactor and optionally also climate data (weather conditions, ambient temperature, atmospheric humidity, air pressure) and/or time indications (time, date). On the basis of the data analysis using optimization algorithms for parameter adaptation new parameters are calculated. In one embodiment parameter optimization is carried out offline In another embodiment algorithms are employed which calculate a parameter adaptation in real time, i.e. undertake an online optimization. The optimized parameters are then used to control the process. As a result of this feedback dynamic process management is thus effected and product quality is therefore subject to only very minor variations.

In one embodiment the polyurethane prepolymers are isocyanate-terminated prepolymers. In another embodiment the polyurethane prepolymers are hydroxy-terminated prepolymers.

In the process according to the invention di- or polyisocyanates are reacted with compounds having isocyanate-reactive hydrogen atoms. The process according to the invention can be applied to various di- or polyisocyanates, in particular to aromatic or aliphatic di- or polyisocyanates. MMDI and PMDI are particularly suitable as isocyanates for the process according to the invention.

Aliphatic diisocyanates employed are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate ($H_{12}$MDI).

Preferred aliphatic polyisocyanates are hexamethylene 1,6-diisocyanate (HDI), 1-isocyanato-3,3,5-trimethyl-5-isocyanatomethylcyclohexane and methylene dicyclohexyl 4,4'-, 2,4'- and/or 2,2'-diisocyanate ($H_{12}$MDI).

Suitable aromatic diisocyanates are especially naphthylene 1,5-diisocyanate (NDI), tolylene 2,4- and/or 2,6-diisocyanate (TDI), diphenylmethane 2,2'-, 2,4'- and/or 4,4'-diisocyanate (MMDI) or else mixtures thereof and higher homologs (PMDI), 3,3'-dimethyl-4,4'-diisocyanatodiphenyl (TODD, p-phenylene diisocyanate (PDI), diphenylethane 4,4'-diisocyanate (EDI), diphenylmethane diisocyanate, 3,3'-dimethyldiphenyl diisocyanate, diphenylethane 1,2-diisocyanate and/or phenylene diisocyanate.

In a further embodiment the present invention also relates to a composition as described above, wherein the isocyanate composition is at least one isocyanate selected from the group consisting of diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyl-4,4'-diisocyanatodiphenyl (TODD, p-phenylene diisocyanate (PDI), hexamethylene 1,6-diisocyanate (HDI), 1-isocyanato-3,3,5-trimethyl-5-isocyanatomethylcyclohexane and methylenedicyclohexyl 4,4'-, 2,4'- and/or 2,2'-diisocyanate $H_{12}$MDI), and 1-isocyanato-3,3,5-trimethyl-5-(isophorone diisocyanate, IPDI) or derivatives of these isocyanates.

It is also possible in the context of the present invention to use higher-functionality isocyanates, by way of example triisocyanates, for example triphenylmethane 4,4',4"-triisocyanate, and also the cyanurates of the aforementioned diisocyanates, and the oligomers obtainable by partial reaction of diisocyanates with water, for example the biurets of the aforementioned diisocyanates, and additionally oligomers obtainable by controlled reaction of semiblocked diisocyanates with polyols having an average of more than two and preferably three or more hydroxyl groups.

According to the invention, the polyisocyanate composition may also comprise one or more solvents. Suitable solvents are known to those skilled in the art. Suitable examples are nonreactive solvents such as ethyl acetate, methyl ethyl ketone, and hydrocarbons.

In one embodiment of the process according to the invention polyether polyols and/or polyester polyols are used as compounds having isocyanate-reactive hydrogen atoms. The spectrum of employable polyols ranges from polyether polyols based on for example propylene glycol (PPGs) or butanediol (PolyTHF) through to polyester polyols. Polyetherols are suitable in accordance with the invention, but so are polyesterols, block copolymers and hybrid polyols such as for example poly(ester/amide) or poly(ester/ether). Preferred polyols are polytetramethylene ether glycol, polyethylene glycols, polypropylene glycols, polyadipates, polycarbonates/polycarbonate diols and polycaprolactone. The number-average molecular weight of the polyols employed according to the invention is preferably $0.3 \times 10^3$ g/mol to $8 \times 10^3$ g/mol, preferably from $0.4 \times 10^3$ g/mol to $5 \times 10^3$ g/mol (the number-average molecular weight is determined according to DIN55672-2, calibration is carried out with PMMA). The hydroxyl numbers of the polyols employable according to the invention are from 5 to 1500 mg KOH/g (according to DIN 5342 [1971-12]). The employed polyols/the polyol composition preferably has/have an average functionality of 1 to 6.5, particularly preferably of 1.5 to 4.5, especially preferably of 1.8 to 4.0.

In a further embodiment the polyol composition comprises a polyol selected from the group consisting of polyethers, polyesters, polycaprolactones and polycarbonates.

Suitable polyols are for example polyetherols such as polytrimethylene oxide or polytetramethylene oxide.

Suitable polyester polyols, especially polyester diols, may be produced, for example, from dicarboxylic acids having 2 to 12 carbon atoms, preferably 4 to 10 carbon atoms, and polyhydric alcohols. Examples of useful dicarboxylic acids include: aliphatic dicarboxylic acids, such as succinic acid, glutaric acid, adipic acid, suberic acid, azelaic acid and sebacic acid, or aromatic dicarboxylic acids, such as phthalic acid, isophthalic acid and terephthalic acid. The dicarboxylic acids may be used individually or in the form of mixtures, for example in the form of a mixture of succinic acid, sebacic acid and adipic acid. For production of the polyester diols, it may possibly be advantageous to use, rather than the dicarboxylic acids, the corresponding dicarboxylic acid derivatives such as carboxylic diesters having 1 to 4 carbon atoms in the alcohol radical, for example dimethyl terephthalate or dimethyl adipate, carboxylic anhydrides, for example succinic anhydride, glutaric anhydride or phthalic anhydride, or carbonyl chlorides. Examples of polyhydric alcohols are glycols having 2 to 10, preferably 2 to 6, carbon atoms, for example ethylene glycol, diethylene glycol, butane-1,4-diol, pentane-1,5-diol, hexane-1,6-diol, decane-1,10-diol, 2,2-dimethylpropane-1,3-diol, propane-1,3-diol, 2-methylpropane-1,3-diol, 3-methylpentane-1,5-diol or dipropylene glycol. The polyhydric alcohols may be used individually or as mixtures, for example in the form of a butane-1,4-diol and/or propane-1,3-diol mixture. In addition, it is also possible to include small amounts of up to 3% by weight of the total reaction mixture of higher-functionality polyols of low molecular weight, for example 1,1,1-trimethylolpropane or pentaerythritol.

Suitable block copolymers are for example those having ether and ester blocks, for example polycaprolactone having polyethylene oxide or polypropylene oxide end blocks, or else polyethers having polycaprolactone end blocks. According to the invention preferred polyetherols are polyethylene glycols and polypropylene glycols. Polycaprolactone is also preferred.

However, it is also possible to employ polyol mixtures in the context of the present invention. According to the invention the polyol composition may also comprise solvents. Suitable solvents are known per se to those skilled in the art.

In one embodiment of the process polyol components and isocyanate components and optionally catalysts, additives, auxiliary and/or added substances are combined in a mixing apparatus.

The prepolymers produced by the process according to the invention may be admixed with stabilizers such as for example water scavengers or complexing agents which reduce susceptibility to atmospheric humidity/impurities and thus improve the storage stability of the prepolymers. Preferably employed stabilizers are acids, such as phosphoric acid or citric acid, benzoyl chloride and/or paretoluenesulfonyl isocyanate. If present, the concentration of these compounds in the prepolymer is from 0.01% by weight to 3% by weight, preferably from 0.01% by weight to 0.1% by weight.

Employable catalysts include basic polyurethane catalysts, for example tertiary amines, such as triethylamine, tributylamine, dimethylbenzylamine, dicyclohexylmethylamine, dimethylcyclohexylamine, bis(2-dimethylaminoethyl) ether, bis(dimethylaminopropyl)urea, N-methyl- or N-ethylmorpholine, N-cyclohexylmorpholine, N,N,N',N'-tetramethylethylenediamine, N,N,N,N-tetramethylbutanediamine, N,N,N,N-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco), 1,8-diazabicyclo[5.4.0]undec-7-ene, and alkanolamine compounds such as triethanolamine, triisopropanolamine, N-methyl- and N-ethyldiethanolamine, dimethylaminoethanol, 2-(N,N-dimethylaminoethoxy)ethanol, N,N',N''-tris(dialkylaminoalkyl)hexahydrotriazines, for example N,N',N''-tris(dimethylaminopropyl)-s-hexahydrotriazine, and triethylenediamine. Also suitable are metal salts, such as tin, titanium, zirconium, hafnium, bismuth, zinc, aluminum and iron compounds, for example organotins, preferably alkyltin compounds such as dimethyltin or diethyltin, or organotins based on aliphatic carboxylic acid derivatives, preferably tin diacetate, tin dilaurate, dibutyltin diacetate, dibutyltin dilaurate, bismuth compounds, such as organobismuths or related compounds or iron compounds, preferably iron(II) acetylacetonate, iron(II) chloride or metal salts of carboxylic acids such as tin(II) isooctoate, tin dioctoate, titanate esters, zinc chloride or bismuth(III) neodecanoate.

Further useful catalysts include: amidines such as 2,3-dimethyl-3,4,5,6-tetrahydropyrimidine, tetraalkylammonium hydroxides such as tetramethylammonium hydroxide, alkali metal hydroxides such as sodium hydroxide, and alkali metal alkoxides such as sodium methoxide and potassium isopropoxide, and also alkali metal salts of acids, especially long-chain fatty acids having 10 to 20 carbon atoms and optionally lateral OH groups.

Surface-active substances may also be part of the reaction mixture. Contemplated compounds include for example those that promote homogenization of the starting materials and are optionally also suitable for regulating the cell structure of the ultimately produced plastics. Examples include for example emulsifiers, such as sodium salts of castor oil sulfates or of fatty acids and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane-oxalkylene copolymers and other organopolysiloxanes, ethoxylated alkylphenols, ethoxylated fatty alcohols, paraffin oils, castor oil esters or ricinoleic esters, turkey red oil and peanut oil, and cell regulators, such as paraffins, fatty alcohols and dimethylpolysiloxanes. Silicone stabilizers are particularly preferred.

Chain extenders may also be added to the reaction mixture as additives. Chain extenders used may, for example, be commonly known aliphatic, araliphatic, aromatic and/or cycloaliphatic compounds having a molecular weight of 50 to 499 g/mol, preferably bifunctional compounds, for example alkanediols having 2 to 10 carbon atoms in the alkylene radical, for example diols selected from the group consisting of $C_2$- to $C_6$-diols, preferably butane-1,4-diol, hexane-1,6-diol and/or di-, tri-, tetra-, penta-, hexa-, hepta-, octa-, nona- and/or decaalkylene glycols having 3 to 8 carbon atoms, preferably unbranched alkanediols, especially propane-1,3-diol, butane-1,4-diol and hexane-1,6-diol. Also suitable as chain extenders within the context of the present invention are branched compounds such as cyclohexyl-1,4-dimethanol, 2-butyl-2-ethylpropanediol, neopentyl glycol, 2,2,4-trimethylpentane-1,3-diol, pinacol, 2-ethylhexane-1,3-diol, cyclohexane-1,4-diol or N-phenyldiethanolamine. Compounds having OH and NH groups are also suitable, such as 4-aminobutanol for example. It is also possible in accordance with the invention to use mixtures of two or more chain extenders.

Any additives, added substances or auxiliaries present can be selected, for example, from the group of fillers, blowing agents, flame retardinants, dyes, pigments, IR-absorbing materials, UV stabilizers, plasticizers, antistatic agents, fungistatic agents, bacteriostatic agents, hydrolysis inhibitors, antioxidants, cell regulators and mixtures thereof.

In one embodiment the addition of additives, added substances or auxiliaries is carried out after the continuous manufacture of the prepolymers before or after any cooling step but before containerizing.

Further particulars on auxiliaries and additives may be found for example in Kunststoffhandbuch, Volume 7, "Polyurethane", Carl-Hanser-Verlag Munich, 1st edition, 1966, 2nd edition, 1983 and 3rd edition, 1993.

The prepolymers obtained by the process according to the invention typically have viscosities at 25° C. in the range from 60 mPas to 500 Pas, preferably in the range 80 mPas to 200 Pas, and particularly preferably in the range 90 mPas to 100 Pas (measured according to DIN EN ISO 3219 and with plate/cone measurement geometry at a shear rate of 40 1/s).

Isocyanate-terminated prepolymers may have NCO contents (measured according to EN ISO 11909) of 50% by weight to 0.5% by weight, preferably from 45% by weight to 0.8% by weight, particularly preferably from 35% by weight to 1.0% by weight and most preferably from 33% by weight to 3% by weight.

Hydroxy-terminated prepolymers may likewise be obtained by the process according to the invention. In the context of the present invention a hydroxy-terminated prepolymer is to be understood as meaning that the predominant proportion, for example more than 80%, preferably more than 90%, particularly preferably more than 99%, of the end groups present in the prepolymer are hydroxy groups. Any remaining end groups are isocyanate end groups. Hydroxy-terminated prepolymers can have hydroxide numbers in the range from 3 to 1400 mg KOH/g.

The prepolymers produced by the process according to the invention may be used for producing polyurethanes, in particular polyurethane foams, for example rigid foams, flexible foams, semi-rigid foams or integral foams, adhesives such as for example packaging adhesives and hotmelt adhesives, sealants, elastomers, coatings, thermosets and thermoplastics.

The prepolymers produced by the process according to the invention may be sent continuously or else via interposed storage tanks to further processing techniques such as injection molding, extrusion, low-pressure processing or high-pressure processing.

In an exemplary embodiment of the process the polyol components are pumped into the mixing apparatus by means of screw pumps from storage containers (optionally via a heat exchanger heated with oil, water or steam to establish a desired temperature). The polyol components may alternatively also be metered at storage or ambient temperature without utilization of the heat exchanger. Two or more polyol components may also be premixed in an upstream static mixer and preheated in a heat exchanger so that only one polyol stream enters the mixing apparatus.

In one embodiment of the process the isocyanate components from storage containers are likewise premixed in a static mixer and optionally temperature-controlled via a heat exchanger. Two or more isocyanate components may be premixed and the isocyanate components dosed either in a temperature-controlled state or else at ambient temperature. In an exemplary embodiment the isocyanate components are conveyed via screw pumps.

Downstream of the mixing apparatus the isocyanate-polyol mixture flows continuously through a heat exchanger and is therein brought to the desired starting temperature of the reaction. Arranged downstream of the heat exchanger is the plug-flow reactor.

In one embodiment of the process the exact dosing streams of the reactants are captured via mass flow meters and used as a basis for control of the reactant stream dosed into the residence time reactor.

If necessary, additional components may be added to the material stream upstream or downstream of the residence time reactor, for example catalysts known in principle to those skilled in the art, stabilizers, additives or blowing agents.

In one embodiment of the process according to the invention the reaction product leaving the residence time reactor is conveyed into a downstream heat exchanger for cooling and therein brought to containerizing temperature. Here too, various types of heat exchangers are contemplated, for example a plate heat exchanger. The product may then be directly containerized, for example in customer receptacles (drum, IBC), a tanker truck or a storage tank. The product may additionally also be directly further processed and for example sent directly to a foaming, casting, extrusion or injection molding process or other polyurethane processing operations.

In one embodiment of the process according to the invention the selection of a polyurethane prepolymer to be produced is made during operation, i.e. the process is switched to another product. This allows just-in-time production of a bespoke prepolymer. Product selection may be effected for example via a QR code that calls up a formulation stored in the process control system.

In an exemplary embodiment of the process the premixed components (isocyanates, polyols and optionally further components) are brought to a predetermined temperature via a heat exchanger and then reacted in a static mixer as the residence time reactor. Conversion is captured via an NIR probe linked to the process control system. The link may in turn go back to reaction time, reaction temperature and dosing units and adapt these according to product specification.

In an exemplary embodiment of the process to initiate a lot production the polyol components and isocyanate components are initially recirculated via the mass flow meters of the raw material dosing lines to bleed air out of the system and fill the mass flow meters. Subsequently, the dosing valves to the mixing unit are simultaneously opened and the components combined in the correct formulation ratio.

In an exemplary embodiment of the process to terminate the lot production the dosing valves to the mixing unit are closed and the dosing of the raw materials is terminated. While maintaining the selected residence time the plant is emptied into the respective receptacle and thus ideally nothing remains in the plant as waste. If necessary, the system can then be rinsed with pure isocyanate or cleaned with other cleaning agents.

In a further exemplary embodiment of the process polyol components and isocyanate components and optionally additives and catalysts are combined in a mixing apparatus. The polyol components are pumped into a mixing unit (static or dynamic mixing unit) by means of conveying pumps (for example gear pumps, screw pumps) from any desired storage containers (for example tank, IBC, drum) optionally via a mixing means for premixing (static or dynamic mixing unit) and a heat exchanger (wherein oil, water or steam heating are possible) to establish a desired temperature. The polyol components may alternatively also be metered at storage or ambient temperature without utilization of the heat exchanger. The isocyanate components are likewise passed from storage containers into the mixing apparatus optionally after premixing in a static mixer and temperature-controlling, wherein two or more isocyanate components may be supplied both premixed as a stream or as two or more individual streams, and the isocyanate components may be dosed either in a temperature-controlled state or at ambient temperature. Analogously to the polyol components the isocyanate components are conveyed via pumps. In addition to the polyol and isocyanate components additives and catalysts may also be incorporated into the polyol and/or isocyanate stream according to the formulation.

The exact dosing streams of the reactants are captured via mass flow meters and used as a basis for dosing stream control. Downstream of the mixing apparatus the isocyanate-polyol mixture flows continuously through a heat exchanger and is therein brought to the desired starting temperature of the reaction. A plug-flow reactor is located downstream of the heat exchanger to maintain an even distribution of residence times. The plug-flow reactor is brought to the desired starting temperature of the reaction only during startup so that not too much reaction energy is lost through the heating of the steel. Heating may be effected using a double-walled static mixer with oil, water or steam heating or electrical trace heating. In order to ensure the most adiabatic operation of the plug-flow reactor possible, said reactor must be well insulated.

After leaving the plug-flow reactor the product stream is conveyed into a heat exchanger for cooling. Here too, different heat exchanger types are suitable, for example tube bundle heat exchangers or plate heat exchangers, both countercurrent and cocurrent. The product may then be directly containerized in customer receptacles (drum, IBC), a tanker truck or a storage tank.

To initiate a lot production the raw materials, polyol components and isocyanate components, are initially recirculated via the mass flow meters of the raw material dosing lines to bleed air out of the system and fill the mass flow meters. Subsequently, the dosing valves to the mixing unit upstream of the residence time reactor are simultaneously opened and the components combined in the correct formulation ratio. To terminate the lot production the dosing valves to the mixing unit upstream of the residence time reactor are closed and the dosing of the raw materials is terminated. While maintaining the selected residence time the plant is emptied into the respective receptacle and thus ideally nothing remains in the plant as waste. If necessary, the system can then be rinsed with pure isocyanate or else cleaned with other cleaning agents.

The products obtained with the process according to the invention have excellent storage stabilities and the corresponding polyurethane moldings provide identical properties as polyurethane prepolymers produced using a conventional stirred tank process.

The invention further provides an apparatus for continuous production of polyurethane prepolymers. The apparatus according to the invention comprises a) a residence time reactor with plug flow; b) a heat exchanger connected upstream of the residence time reactor; c) at least one apparatus for conveying a material stream through the residence time reactor; d) at least one apparatus for periodic or continuous determination of at least one physical property of a product stream leaving the residence time reactor; and e) an apparatus for controlling the temperature of the heat exchanger and the conveying amount of the apparatus for conveying a material stream through the residence time reactor. In one embodiment the apparatus additionally comprises f) a heat exchanger connected downstream of the residence time reactor. In a further embodiment the apparatus additionally comprises g) at least one mixing apparatus connected upstream of the residence time reactor which in one embodiment is a static mixer. In one embodiment the apparatus additionally comprises h) means for temperature-controlling the mixing apparatus and/or for temperature-controlling material streams supplied to the mixing apparatus.

In one embodiment the residence time reactor is an adiabatic residence time reactor, for example a static mixer which is in one variant provided with a double jacket as insulation, or a dynamic mixer which is in one variant provided with a double jacket as insulation.

Figure 3:
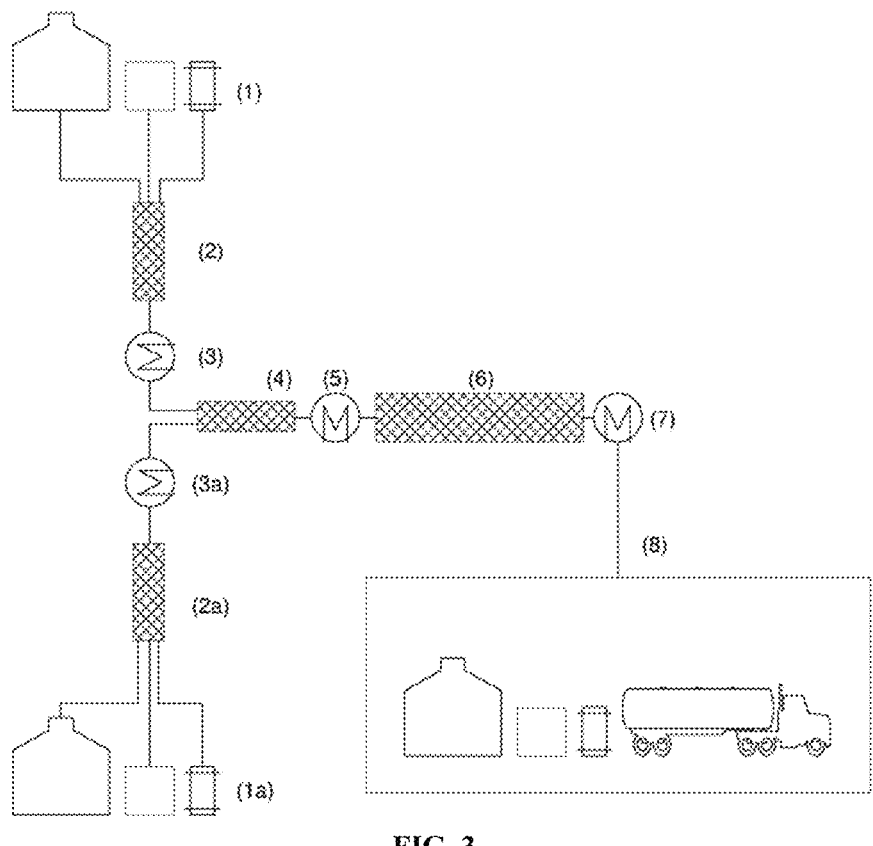
FIG. 3 shows an apparatus according to the invention for continuous production of polyurethane prepolymers.

FIG. 3 shows by way of example an apparatus according to the invention for continuous production of polyurethane prepolymers. The apparatus comprises storage containers 1, 1a (for example tank, IBC, drum) for the reactants; mixing means 2, 2a for premixing of the reactants (static or dynamic mixing unit); heat exchangers 3, 3a (for example with oil, water or steam heating) for establishing a desired temperature of the reactant streams; a mixing apparatus 4 for the reactants (static or dynamic mixing unit); a heat exchanger 5 for the reactant mixture; a plug flow reactor 6; a heat exchanger 7 for cooling the product stream; and product container 8 (drum, IBC, tanker truck or storage tank).

The invention also provides a computer system for controlling a continuous production of polyurethane prepolymers by the process according to the invention. The computer system comprises at least:

an interface unit which is configured to periodically or continuously retrieve from the residence time reactor at least one physical property of the product leaving the residence time reactor and to input it as an input parameter,

a processor which is configured to compare the periodically or continuously retrieved at least one physical property of the product leaving the residence time reactor with a predetermined target value of the at least one physical property stored and retrievable in a database in communicative connection with the processor and in the event of deviation from the predetermined target value dynamically adapt the temperature and/or the flow rate of the reactants entering the residence time reactor and/or the flow rate through the residence time reactor and/or the temperature of the residence time reactor through appropriate control. In one embodiment the processor is configured such that in the event of deviation from the predetermined target value the temperature and/or the flow rate of the reactants entering the residence time reactor and/or the flow rate through the residence time reactor are dynamically adapted through appropriate control.

In one embodiment the computer system is configured to be linked to the apparatus according to the invention via a wireless and/or wired connection and to at least semi-automatically via the interface unit retrieve and input the at least one physical property of the product leaving the residence time reactor and the temperature and/or the flow rate of the reactants entering the residence time reactor and/or the flow rate through the residence time reactor and/or the temperature of the residence time reactor. In one embodiment the computer system is configured such that in the event of a deviation from the predetermined target value the temperature and/or the flow rate of the reactants entering the residence time reactor and/or the flow rate through the residence time reactor are dynamically adapted through appropriate control.

In a further embodiment the processor of the computer system has implemented on it a self-learning algorithm for automatic comparison of the at least one physical property of the product leaving the residence time reactor with the predetermined target value of the at least one physical property and in reaction thereto for automatic control and dynamic adaptation of the temperature and/or the flow rate of the reactants entering the residence time reactor and/or the flow rate through the residence time reactor and/or the temperature of the residence time reactor via the interface unit The algorithm is configured to optimize the process according to the invention for producing polyurethane prepolymers by dynamic adaptation of the temperature and/or the flow rate(s).

The invention also provides a computer program product which when loaded into a storage unit of a processing unit, in particular of a computer system according to the invention, and executed by at least one processor, in particular the processor of the computer system according to the invention, in a process according to the invention periodically or continuously retrieves at least one physical property of the product leaving the residence time reactor and compares it with a predetermined target value and in the event of a deviation from the predetermined target value dynamically adapts the temperature and/or the flow rate of the reactants entering the residence time reactor and/or the flow rate through the residence time reactor and/or the temperature of the residence time reactor. In one embodiment the computer program product is configured such that in the event of a deviation from the predetermined target value the temperature and/or the flow rate of the reactants entering the residence time reactor and/or the flow rate through the residence time reactor are dynamically adapted through appropriate control.

The invention also provides a computer-implemented method for controlling the production of polyurethane prepolymers, in particular as part of a process according to the invention, comprising at least:

receiving data of at least one physical property of a product leaving a residence time reactor in real time, comparing the data with a predetermined target value of the at least one physical property stored and retrievable in a database, and in the event of a deviation from the specified target value, dynamically adapting a temperature and/or a flow rate of the reactants entering the residence time reactor and/or a flow rate through the residence time reactor and/or the temperature of the residence time reactor through control.

In one embodiment of the process in the event of a deviation from the predetermined target value the temperature and/or the flow rate of the reactants entering the residence time reactor and/or the flow rate through the residence time reactor are dynamically adapted through appropriate control.

Examples of physical properties of the product are NCO value (determined according to EN ISO 11909), viscosity (measured at 25° C. according to DIN EN ISO 3219 with plate/cone measurement geometry at a shear rate of 40 1/s), molecular weight (number-average according to DIN55672-2, calibration with PMMA), hydroxyl number (according to DIN 5342 [1971-12]), or color number (Hazen color number according to ISO 6271 or Gardner color number according to ISO 4630).

EXAMPLES

Input Materials

Isocyanate 1: 4,4'-diphenylmethane diisocyanate (4,4'-MDI), molar mass 250.26 g/mol, NCO 33.5% (Lupranat® ME, BASF SE);

Isocyanate 2 carbodiimide-modified 4,4'-diphenylmethane diisocyanate (4,4'-MDI), NCO: 29.5% (Lupranat® MM 103, BASF SE);

Isocyanate 3: 1:1 mixture of 4,4'-diphenylmethane diisocyanate (4,4'-MDI) and 2,4'-diphenylmethane diisocyanate (2,4'-MDI), molar mass 250.26 g/mol, NCO 33.5% (Lupranat® MI, BASF SE);

Isocyanate 4: polymeric isocyanate consisting of 2,2'-, 2,4'- and 4,4'-diphenylmethane diisocyanate (MDI), NCO: 31.5% (Lupranat® M205, BASF SE);

Polyol 1: Polyetherol having an OH number of about 104, constructed from propylene glycol and propylene oxide (MW: about 1070 g/mol);

Polyol 2 dipropylene glycol (DPG) having an OH number of 840 (MW: 134 g/mol);

Polyol 3 tripropylene glycol (TPG) having an OH number of 582 (MW: 183 g/mol);

Polyol 4: Polyetherol having an OH number of about 55, constructed from propylene glycol and propylene oxide (MW: about 2000 g/mol);

Polyol 5: Trimethylolpropane (TMP) having an OH number of 1235 (MW: 134 g/mol);

Polyol 6: Polytetrahydrofuran (pTHF; polytetramethylene ether glycol, PTMEG) having an OH number of about 56 (MW: about 2000 g/mol);

Polyol 7: Polyesterol having an OH number of about 60, constructed from adipic acid, monoethylene glycol, diethylene glycol and glycerol (MW: about 2500 g/mol);

Polyol 8 Polyetherol having an OH number of about 30, constructed from propylene glycol, propylene oxide and ethylene oxide (MW: about 3400 g/mol);

Polyol 9 Polyetherol having an OH number of about 27, constructed from glycerol, propylene oxide and ethylene oxide (MW: about 5200 g/mol);

Polyol 10 Polyetherol having an OH number of about 28, constructed from glycerol, propylene oxide and ethylene oxide (MW: about 5400 g/mol);

Polyol 11 Polyetherol having an OH number of about 250, constructed from dimethylaminopropylamine and propylene oxide (MW: about 450 g/mol);

Polyol 12 Polyetherol having an OH number of about 630, constructed from pentaerythritol and ethylene oxide (MW: about 360 g/mol);

Polyol 13 Polyetherol having an OH number of about 42, constructed from glycerol, propylene oxide and ethylene oxide (MW: about 3500 g/mol)

Chain extender 1 1,4-butanediol,

Additive 1 diethylene glycol bis-chloroformate;

Additive 2 silicone stabilizer (DABCO DC 193, Evonik Industries AG);

Additive 3 black paste (Bayflex® black paste N, Covestro AG);

Additive 4 silicone stabilizer (Dow Corning® 57 Additive, Dow Corning Corp.);

Additive 5 emulsifier based on half ester of maleic acid, olefin copolymer and bis(2-propylheptyl) phthalate;

Additive 6 water;

Catalyst 1 triethylenediamine blocked with sebacic acid;

Catalyst 2 dimethylethanolamine;

Catalyst 3 bis(2-dimethylaminoethyl) ether;

Catalyst 4 potassium acetate in monoethylene glycol;

Catalyst 5 N,N,N-trimethyl-N-hydroxyethyl-bis(aminoethyl ether).

Unless explicitly stated otherwise, all percentages are percentages by weight.

Determination of Physical Properties

The following properties of the obtained prepolymers/polyurethanes were determined by the following methods:

Determination of Molecular Weight:

Number-average molecular weight was determined according to DIN 55672-2. A calibration with PMMA was carried out here.

NCO Value Determination:

Determination of the NCO content was conducted according to EN ISO 11909: primary and secondary amines react with isocyanates to give substituted ureas.

This reaction proceeds quantitatively in an excess of amine. At the end of the reaction the excess amine is subjected to potentiometric back-titration with hydrochloric acid.

Measurement of Hydroxyl Number:

The hydroxyl numbers were determined according to DIN 53240 (1971-12).

Viscosity Determination:

Unless otherwise stated viscosity was measured at 25° C. according to DIN EN ISO 3219 (1994) with a Brookfield CAP2000 instrument with plate/cone measurement geometry (PK100, for example using a PK 1 1° cone of the 28 mm diameter and a cone angle of 1°) at a shear rate of 40 1/s.

Mechanical Tests:

The properties of the polyurethanes obtained were determined by the specified methods:

Density: DIN EN ISO 1183-1, A

Hardness (Shore A/D): DIN ISO 7619-1 or ASTM D2240

Tensile strength/elongation at break: DIN 53504

Tear propagation resistance: DIN ISO 34-1, B (b)

Rebound resilience DIN 53512

Compression set ASTM D395

Glass transition temperature Tg was determined by differential scanning calorimetry (DIN EN ISO 11357-1 at 20 K/min).

Production of Prepolymers

Production Process 1 for PU (Polyurethane) Prepolymers (Comparative Example)

The respective isocyanate was initially charged with additive 1 at 50° C. in a 50 kg reactor with nitrogen blanketing and a stirrer and the respective polyol was added at this temperature. The reaction mixture was heated to 70-80° C. The reaction mixture was stirred at 80° C. for 2 hours and then pumped out into a storage vessel at temperatures between RT (=room temperature) and 60° C. without further treatment.

Production Process 2 for PU Prepolymers (Inventive)

The respective isocyanate (or a mixture of isocyanates) was mixed with additive 1 at 50° C. in a storage tank to afford the final isocyanate component and premixed with the respective polyol (or a polyol mixture) by means of a short static mixer unit. This reactive mixture was brought to the appropriate reaction temperature via a plate heat exchanger and then pumped to the adiabatic residence time reactor. A static mixer with a double jacket was used as the adiabatic residence time reactor with plug flow. The exact dosing streams of the reactants were captured via mass flow meters and used as a basis for dosing stream control. The reaction mixture was converted into the final product in the tubular reactor/residence time reactor over 10 minutes and then cooled to about 60° C. via a further plate heat exchanger and transferred to a suitable storage receptacle. The reaction profile was monitored using an NIR probe (the NIR probe was located at the end of the residence time reactor downstream of the plate heat exchanger) and the starting temperature was adapted according to FIGS. 1 and 2.

The data of the inventive production examples and the comparative examples are summarized in the following tables 1-4.

TABLE 1

| | Prepolymer no. | | | |
| | 1 Comparison 1a | 2a Example 1a | 2b Comparison 1b | 2c Example 1b |
| --- | --- | --- | --- | --- |
| Isocyanate 1 [% by wt] | 73.9 | 73.9 | 73.9 | 73.9 |
| Isocyanate 2 [% by wt] | 4.2 | 4.2 | 4.2 | 4.2 |
| Isocyanate 3 [% by wt] | | | | |
| Polyol 1 [% by wt] | 14.4 | 14.4 | 14.4 | 14.4 |
| Polyol 2 [% by wt] | 5.0 | 5.0 | 5.0 | 5.0 |
| Polyol 3 [% by wt] | 2.5 | 2.5 | 2.5 | 2.5 |
| Polyol 4 [% by wt] | | | | |
| Additive 1 [% by wt] | 0.02 | 0.02 | 0.02 | 0.02 |
| Reaction/starting temperature [° C.] | 80 | 60 | 80 | 100 |
| Flow rate [kg/min] | — | 2 | 2 | 2 |
| Reaction/residence time [min] | 120 | 10 | 120 | 10 |
| NCO [%] | 20.4 | 21.1 | 20.2 | 19.8 |

TABLE 2

| | Prepolymer no. | | | |
|---|---|---|---|---|
| | 1 Comparison 1a | 2d Example 1c | 3 Comparison 2 | 4 Example 2 |
| Isocyanate 1 [% by wt] | 73.9 | 73.9 | | |
| Isocyanate 2 [% by wt] | 4.2 | 4.2 | | |
| Isocyanate 3 [% by wt] | | | 36.2 | 36.2 |
| Polyol 1 [% by wt] | 14.4 | 14.4 | | |
| Polyol 2 [% by wt] | 5.0 | 5.0 | | |
| Polyol 3 [% by wt] | 2.5 | 2.5 | | |
| Polyol 4 [% by wt] | | | 63.7 | 63.7 |
| Additive 1 [% by wt] | 0.02 | 0.02 | 0.01 | 0.01 |
| Reaction/starting temperature [° C.] | 80 | 80 | 80 | 120 |
| Flow rate [kg/min] | — | 2 | — | 2 |
| Reaction/residence time [min] | 120 | 10 | 120 | 10 |
| NCO [%] | 20.4 | 20.2 | 9.4 | 9.7 |

TABLE 3

| | Prepolymer no. | | | |
|---|---|---|---|---|
| | 5 Comparison 3 | 6 Example 3 | 7 Comparison 4 | 8 Example 4 |
| Isocyanate 1 [% by wt] | 33.9 | 33.9 | | |
| Isocyanate 2 [% by wt] | 59.5 | 59.5 | | |
| Isocyanate 3 [% by wt] | | | 26.5 | 26.5 |
| Polyol 5 [% by wt] | 6.6 | 6.6 | | |
| Polyol 6 [% by wt] | | | 73.5 | 73.5 |
| Additive 1 [% by wt] | 0.04 | 0.04 | 0.02 | 0.02 |
| Reaction/starting temperature [° C.] | 80 | 90 | 80 | 100 |
| Flow rate [kg/min] | — | 2 | — | 2 |
| Reaction/residence time [min] | 120 | 10 | 120 | 10 |
| NCO [%] | 26.0 | 25.9 | 5.8 | 5.8 |

TABLE 4

| | Prepolymer no. | |
|---|---|---|
| | 9 Comparison 5 | 10 Example 5 |
| Isocyanate 2 [% by wt] | 67.0 | 67.0 |
| Isocyanate 3 [% by wt] | 6.0 | 6.0 |
| Polyol 7 [% by wt] | 27.0 | 27.0 |
| Additive 1 [% by wt] | 0.003 | 0.003 |
| Reaction/starting temperature [° C.] | 85 | 100 |
| Flow rate [kg/min] | — | 2 |
| Reaction/residence time [min] | 100 | 10 |
| NCO [%] | 22.8 | 22.4 |

Production of Moldings with Selected PU Prepolymers

Production of the polyurethane molding was carried out by converting the respective polyol component (A) with the respective isocyanate component (B). The data of the inventive production examples and the comparative examples are summarized in the following tables 5 and 6 below.

TABLE 5

Usage tests (flexible molded foam) with prepolymer 1 (comparison) and prepolymer 2d (inventive).

| | | Comparison 6 | Example 6 |
|---|---|---|---|
| A | Polyol 8 [% by wt] | 60.1 | 60.1 |
| | Polyol 9 [% by wt] | 25.6 | 25.6 |
| | Chain extender [% by wt] | 9.8 | 9.8 |
| | Catalyst 1 [% by wt] | 1.5 | 1.5 |
| | Catalyst 2 [% by wt] | 1.0 | 1.0 |
| | Catalyst 3 [% by wt] | 0.3 | 0.3 |
| | Additive 2 [% by wt] | 0.8 | 0.8 |
| | Additive 6 [% by wt] | 0.2 | 0.2 |
| | Additive 4 [% by wt] | 0.7 | 0.7 |
| B | Prepolymer 1 [% by wt] | 100 | |
| | Prepolymer 2d [% by wt] | | 100 |
| | Hardness [Shore A] | 53 | 54 |
| | Tear propagation resistance [N/mm] | 7.7 | 9.1 |
| | Tensile strength [MPa] | 4.4 | 4.3 |
| | Elongation at break [%] | 408 | 441 |
| | Rebound resilience [%] | 26 | 28 |

TABLE 6

Usage tests (flexible molded foam) with prepolymer 5 (comparison) and prepolymer 6 (inventive).

| | | Comparison 7 | Example 7 |
|---|---|---|---|
| A | Polyol 10 [% by wt] | 86.8 | 86.8 |
| | Polyol 11 [% by wt] | 1.5 | 1.5 |
| | Polyol 12 [% by wt] | 7.1 | 7.1 |
| | Polyol 13 [% by wt] | 0.7 | 0.7 |
| | Catalyst 4 [% by wt] | 0.3 | 0.3 |
| | Catalyst 5 [% by wt] | 0.3 | 0.3 |
| | Additive 5 [% by wt] | 0.3 | 0.3 |
| | Additive 3 [% by wt] | 0.3 | 0.3 |
| | Additive 6 [% by wt] | 2.7 | 2.7 |
| B | Isocyanate 4 [% by wt] | 30.0 | 30.0 |
| | Prepolymer 5 [% by wt] | 70.0 | |
| | Prepolymer 6 [% by wt] | | 70.0 |
| | Density [g/l] | 119 | 118 |
| | Compression set [%] | 38.1 | 40.2 |
| | Pressure at 40% deformation [kPa] | 77.6 | 75.1 |
| | Tensile strength [kPa] | 400 | 411 |
| | Elongation at break [%] | 45 | 50 |

LIST OF REFERENCE NUMERALS

1, 1a Storage container for reactants (e.g. tank, IBC, drum)
2, 2a Mixing means for premixing (static or dynamic)
3, 3a Heat exchanger (for example with oil, water or steam heating)
4 Mixing device (static or dynamic mixing unit)
5 heat exchanger
6 Plug-flow reactor
7 heat exchanger
8 Product containers (drum, IBC, tanker truck or storage tank)

The invention claimed is:

1. A learning continuous process for producing polyurethane prepolymers, the process comprising:
reacting
 a) di- or polyisocyanates;
 b) compounds having isocyanate-reactive hydrogen atoms; and
 c) optionally catalysts, additives, auxiliary and/or added substances
in a residence time reactor with plug flow;

during said reacting, periodically or continuously check-ing the value of at least one physical property of a product leaving the residence time reactor;

comparing the value of the at least one physical property with a predetermined target value of the at least one physical property that is stored and retrievable in a database;

in response to detecting a deviation from the predeter-mined target value, automatically applying optimiza-tion algorithms to calculate optimized parameters of a temperature and/or a flow rate of the reactants entering the residence time reactor and/or a flow rate through the residence time reactor and/or a temperature of the residence time reactor; and automatically adapting said reacting to apply the opti-mized parameters for the temperature and/or flow rate of the reactants entering the residence time reactor and/or the flow rate through the residence time reactor and/or the temperature of the residence time reactor.

2. The process according to claim 1, wherein adiabatic reaction conditions are established in the residence time reactor and wherein in the event of a deviation from the predetermined target value the temperature and/or the flow rate of the reactants entering the residence time reactor and/or the flow rate through the residence time reactor are adapted.

3. The process according to claim 1, wherein the flow rate through the residence time reactor is adjusted by controlling the conveying amount of the reactants into the residence time reactor.

4. The process according to claim 1, wherein a compo-sition of the product leaving the residence time reactor is determined by NIR spectroscopy.

5. The process according to claim 1, wherein the reactants entering the residence time reactor have a temperature in the range from 40° C. to 150° C.

6. The process according to claim 1, wherein the residence time in the residence time reactor is 5 to 15 minutes.

7. The process according to claim 1, wherein the at least one physical property is selected from the group consisting of NCO content, OH number for OH-terminated prepoly-mers, viscosity, and molecular weight.

8. The process according to claim 1, wherein in the event of no deviation from the predetermined target value, the temperature and/or the flow rate of the reactants entering the residence time reactor and/or the flow rate through the residence time reactor and/or the temperature of the resi-dence time reactor are unchanged.

* * * * *